US011833861B2

(12) United States Patent
Kosmac et al.

(10) Patent No.: US 11,833,861 B2
(45) Date of Patent: Dec. 5, 2023

(54) TIRE WITH MULTIPLE BODY PLIES

(71) Applicant: Bridgestone Americas Tire Operations, LLC, Nashville, TN (US)

(72) Inventors: Kevin J. Kosmac, Fairlawn, OH (US); Austin J. Fischer, Akron, OH (US); William H. Durivage, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 25 days.

(21) Appl. No.: 17/003,332

(22) Filed: Aug. 26, 2020

(65) Prior Publication Data

US 2021/0061026 A1 Mar. 4, 2021

Related U.S. Application Data

(60) Provisional application No. 62/892,348, filed on Aug. 27, 2019.

(51) Int. Cl.
*B60C 9/18* (2006.01)
*B60C 15/00* (2006.01)
*B60C 9/22* (2006.01)

(52) U.S. Cl.
CPC .......... *B60C 15/0027* (2013.01); *B60C 9/185* (2013.01); *B60C 9/22* (2013.01); *B60C 15/0036* (2013.01); *B60C 15/0072* (2013.01)

(58) Field of Classification Search
CPC ............ B60C 15/0009; B60C 15/0018; B60C 15/0027; B60C 15/0036; B60C 15/0054;
(Continued)

(56) References Cited

U.S. PATENT DOCUMENTS 3,479,238 A 11/1969 Kehoe et al.
4,934,428 A * 6/1990 Aoki ................... B60C 15/0072
152/532

(Continued)

FOREIGN PATENT DOCUMENTS

JP 2002192920 A * 7/2002
JP 2005067279 A * 3/2005
JP 2011116815 A * 6/2011

OTHER PUBLICATIONS

Translation: JP-2005067279-A, Shimada T, (Year: 2022).*
(Continued)

*Primary Examiner* — Kendra Ly (57) ABSTRACT

A tire includes a pair of beads and a plurality of body plies extending between the pair of beads, including at least a first body ply and a second body ply. The first body ply wraps around each of the pair of beads, and has a first pair of turn up portions having a first height. The second body ply wraps around each of the pair of beads, and has a second pair of turn up portions having a second height greater than the first height. Each of the second pair of turn up portions is axially inside each of the first turn up portions. The tire also includes a circumferential belt disposed radially above the plurality of body plies, a circumferential tread disposed radially above the circumferential belt, and a pair of sidewalls extending between the pair of beads and the circumferential tread. The tire also has a pair of stabilizer ply inserts, including a first stabilizer ply insert and a second stabilizer ply insert.

18 Claims, 5 Drawing Sheets

(58) Field of Classification Search
CPC .......... B60C 15/0063; B60C 2015/009; B60C 9/1835; B60C 9/185; B60C 2009/1842; B60C 2009/1857; B60C 2009/1864; B60C 2009/1871; B60C 2009/1878; B60C 2009/1885; B60C 2009/1892; B60C 15/0072; B60C 15/0081
See application file for complete search history.

(56) References Cited

U.S. PATENT DOCUMENTS

| | | | |
|---|---|---|---|
| 4,972,893 | A | 11/1990 | Komai et al. |
| 5,176,769 | A | 1/1993 | Kadota et al. |
| 7,503,360 | B2 | 3/2009 | Rielly et al. |
| 9,469,162 | B1 | 5/2016 | Givens et al. |
| 2015/0165832 | A1* | 6/2015 | Orlowski .................. B60C 3/04 152/550 |
| 2017/0021678 | A1 | 1/2017 | Rethmel et al. |
| 2019/0248087 | A1* | 8/2019 | Watanabe .............. B29D 30/72 |

OTHER PUBLICATIONS

Machine Translation: JP-2005067279-A, Shimada T, (Year: 2022).*
Machine Translation: JP-2011116815-A, Akagi K, (Year: 2022).*
Machine Translation: JP-2002192920-A, Yotsumoto R, (Year: 2023).*
Yang, X.; Optimization of Reinforcement Turn-up Effect on Tyre Durability and Operating Characteristics for Racing Tyre Design; Materials & Design (vol. 35, Mar. 2012, pp. 798-809); https://www.sciencedirect.com/science/article/abs/pii/S0261306911004201; Available Online Jun. 28, 2011.

* cited by examiner

TIRE WITH MULTIPLE BODY PLIES

CROSS-REFERENCE TO RELATED APPLICATION

This application claims the benefit of U.S. Provisional Patent Application No. 62/892,348, filed on Aug. 27, 2019, the disclosure of which is incorporated by reference herein in its entirety.

FIELD OF INVENTION

This disclosure relates to the field of tires with multiple body plies. More specifically, this disclosure relates to the field of tires with multiple body plies and stabilizer ply inserts.

BACKGROUND

Tires with body plies are known in the art. To build such tires, body plies would be applied to a TAM and wrapped around bead portions. In known embodiments, the first body ply applied to the TAM would be the longest (or widest) and subsequent body plies would be shorter (or narrower). Such configurations would result in tires in which the outer most turn up portion has the greatest radial height, and subsequent turn up portions would have lower radial heights.

SUMMARY OF THE INVENTION

In one embodiment, a tire includes a first annular bead, a second annular bead, and at least three body plies, including a first body ply, a second body ply, and a third body ply, extending between the first annular bead and the second annular bead. The first body ply extends downward, axially inside of the first annular bead and wraps around the first annular bead. The first body ply has a first turn up portion that extends upward, axially outside of the first annular bead. The first turn up portion terminates at a first turn up end. The second body ply extends downward, axially inside of the first annular bead and axially outside of the first body ply and wraps around the first annular bead. The second body ply has a second turn up portion that extends upward, axially outside of the first annular bead and axially inside the first turn up portion. The second turn up portion terminates at a second turn up end that is radially lower than the first turn up end. The third body ply extends downward, axially inside of the first annular bead and axially outside of the second body ply and wraps around the first annular bead. The third body ply has a third turn up portion that extends upward, axially outside of the first annular bead and axially inside the second turn up portion. The third turn up portion terminates at a third turn up end that is radially higher than the first turn up end.

In this embodiment, the tire also includes a circumferential belt disposed radially above the at least three body plies and extending axially across a portion of the at least three body plies. The tire further includes a circumferential tread disposed radially above the circumferential belt, a first sidewall extending between the first annular bead and the circumferential tread, and a second sidewall extending between the second annular bead and the circumferential tread.

In this embodiment, the tire also has a first stabilizer ply insert and a second stabilizer ply insert. The first stabilizer ply insert has a first end that is axially inside a first end of the circumferential belt and radially below the circumferential belt. The first stabilizer ply insert has a second end that is axially outside of the first end of the circumferential belt and radially lower than the third turn up end. The second stabilizer ply insert has a first end that is axially inside a second end of the circumferential belt and radially below the circumferential belt. The second stabilizer ply insert has a second end that is axially outside of the second end of the circumferential belt.

In another embodiment, a method of making a tire includes providing a first body ply having a first width and laying a second body ply above the first body ply. The second body ply has a second width less than the first width. The method also includes laying a third body ply above the second body ply. The third body ply has a third width greater than the first width. The method further includes laying a first bead at a first location above the third body ply, laying a second bead at a second location above the third body ply, laying a first stabilizer ply insert at a third location above the third body ply, and laying a second stabilizer ply insert at a fourth location above the third body ply. The third location is between the first location and the second location, and the fourth location is between the third location and the second location.

In this embodiment, the method also includes wrapping the first body ply, the second body ply, and the third body ply around the first bead, such that the first body ply has a first turn up portion with a first turn up height, the second body ply has a second turn up portion with a second turn up height less than the first turn up height, and the third body ply has a third turn up portion with a third turn up height greater than the first turn up height, and such that the third turn up portion contacts the first stabilizer ply insert. The method further includes wrapping the first body ply, the second body ply, and the third body ply around the second bead, such that the first body ply has a fourth turn up portion with a fourth turn up height, the second body ply has a fifth turn up portion with a fifth turn up height less than the fourth turn up height, and the third body ply has a sixth turn up portion with a sixth turn up height greater than the fourth turn up height, and such that the sixth turn up portion contacts the second stabilizer ply insert.

In yet another embodiment, a tire includes a pair of beads and a plurality of body plies extending between the pair of beads, including at least a first body ply and a second body ply. The first body ply wraps around each of the pair of beads, and has a first pair of turn up portions having a first height. The second body ply wraps around each of the pair of beads, and has a second pair of turn up portions having a second height greater than the first height. Each of the second pair of turn up portions is axially inside each of the first turn up portions. The tire also includes a circumferential belt disposed radially above the plurality of body plies, a circumferential tread disposed radially above the circumferential belt, and a pair of sidewalls extending between the pair of beads and the circumferential tread. The tire also has a pair of stabilizer ply inserts, including a first stabilizer ply insert and a second stabilizer ply insert. The first stabilizer ply insert has a first end that is radially below the circumferential belt, and a second end that radially lower than an end of one of the first pair of turn up portions. The second stabilizer ply insert has a first end that is radially below the circumferential belt, and a second end that radially lower than an end of one of the first pair of turn up portions.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Tread" as used herein, refers to that portion of the tire that comes into contact with the road or ground under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it should be understood that because the terms carry slightly different connotations, one of ordinary skill in the art would not consider any one of the following terms to be purely interchangeable with another term used to describe a common tire component.

Figure 1:
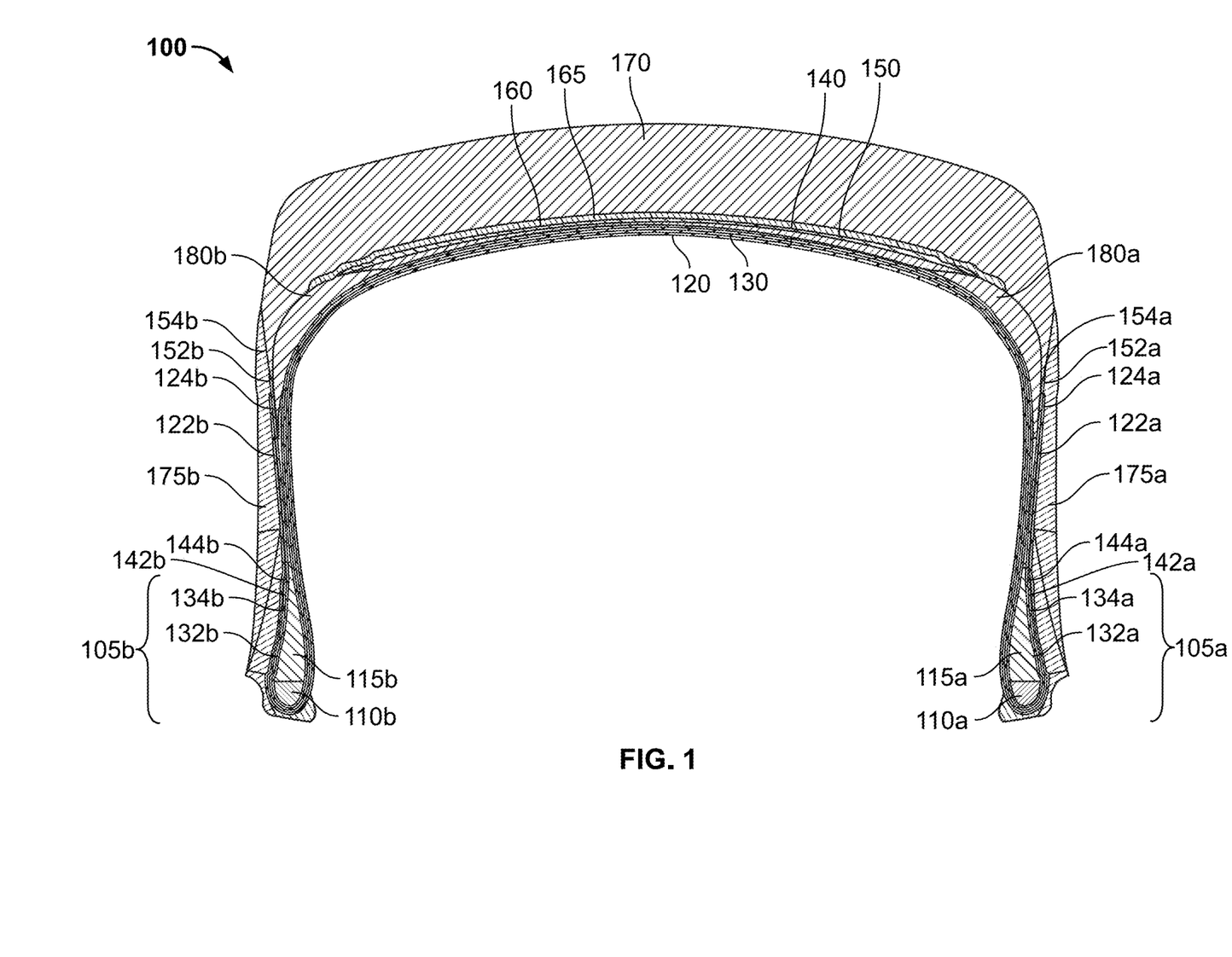
FIG. 1 is a partial cross-section of one embodiment of a tire.
Figure 2:
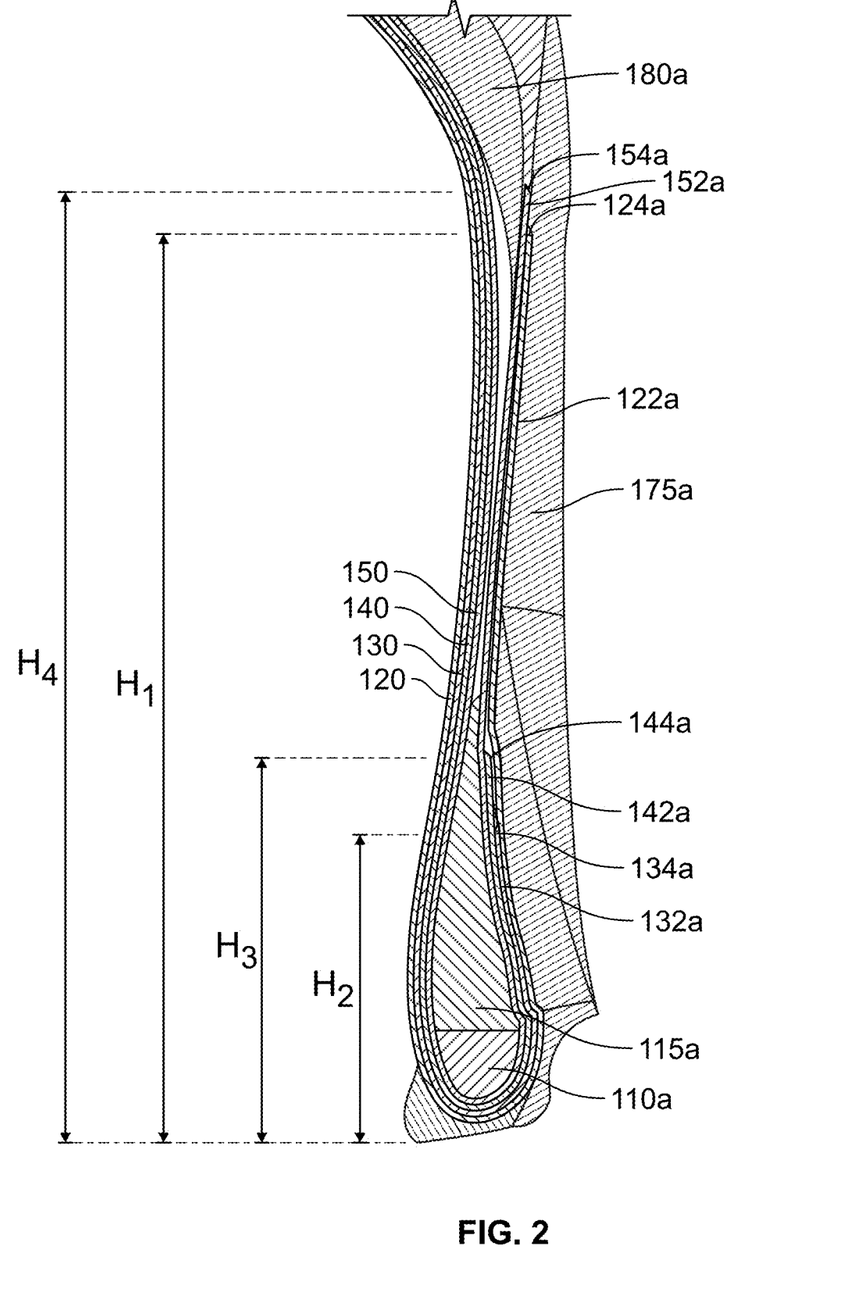
FIG. 2 is a detail view of a bead and sidewall portion of the tire of FIG. 1.

FIG. 1 is a partial cross-section of one embodiment of a tire 100. FIG. 2 is a detail view of a portion of the tire 100. The tire 100 will thus be described with reference to both FIG. 1 and FIG. 2. While only one exemplary embodiment is illustrated, it should be understood that modifications may be employed without departing from the scope of the invention. Several such alternative embodiments are described below, but they are not intended to be limiting.

The tire 100 includes a first annular bead portion 105a and a second annular bead portion 105b. The first annular bead portion 105a includes a first bead core 110a and a first bead filler 115a. A plurality of body plies extends between the first annular bead 105a and the second annular bead 105b. In the illustrated embodiment, the plurality of body plies includes a first body ply 120, a second body ply 130, a third body ply 140 and a fourth body ply 150. In the present specification, the body plies are numbered in the order in which they would be layered on a TAM. This numbering of the body plies, however, is merely for convenience and the claims depart from this convention. It should be understood that the plies may be numbered in any order.

In an alternative embodiment (not shown), three body plies are employed. In yet another alternative embodiment (not shown), five or more body plies may be employed.

The first body ply 120 extends downward, axially inside of the first and second annular beads 105a,b and wraps around the first and second annular beads 105a,b. A first turn up portion 122a of the first body ply 120 extends upward, axially outside of the first annular bead 105a and terminates at a first turn up end 124a. A second turn up portion 122b of the first body ply 120 extends upward, axially outside of the second annular bead 105b and terminates at a second turn up end 124b. The first and second turn up ends 124a,b of the first body ply 120 have a first radial height $H_1$.

The second body ply 130 extends downward, axially inside of the first and second annular beads 105a,b and axially outside of the first body ply 120, and wraps around the first and second annular beads 105a,b. A first turn up portion 132a of the second body ply 130 extends upward, axially outside of the first annular bead and axially inside the first turn up portion 122a of the first body ply 120, and terminates at a first turn up end 134a. A second turn up portion 132b of the second body ply 130 extends upward, axially outside of the second annular bead 105b and axially inside the second turn up portion 122b of the first body ply 120, and terminates at a second turn up end 134b. The first and second turn up ends 134a,b of the second body ply 130 have a second radial height $H_2$ that is less than the first radial height $H_1$.

The third body ply 140 extends downward, axially inside of the first and second annular beads 105a,b and axially outside of the first body ply 120 and the second body ply 130. The third body ply 140 wraps around the first and second annular beads 105a,b. A first turn up portion 142a of the third body ply 140 extends upward, axially outside of the first annular bead, axially inside the first turn up portion 122a of the first body ply 120, and axially inside the first turn up portion 132a of the second body ply 130. The first turn up portion 142a of the third body ply 140 terminates at a first turn up end 144a. A second turn up portion 142b of the third body ply 140 extends upward, axially outside of the second annular bead 105b, axially inside the second turn up portion 122b of the first body ply 120, and axially inside the second turn up portion 132b of the second body ply 130. The second turn up portion 142b of the third body ply 140 terminates at a second turn up end 144b. The first and second turn up ends 144a,b of the third body ply 140 have a third radial height $H_3$ that is less than the first radial height $H_1$, but greater than the second radial height $H_2$.

The fourth body ply 150 extends downward, axially inside of the first and second annular beads 105a,b and axially outside of the first body ply 120, the second body ply 130, and the third body ply 140. The fourth body ply 150 wraps around the first and second annular beads 105a,b. A first turn up portion 152a of the fourth body ply 150 extends upward, axially outside of the first annular bead, axially inside the first turn up portion 122a of the first body ply 120, axially inside the first turn up portion 132a of the second body ply 130, and axially inside the first turn up portion 142a of the third body ply 140. The first turn up portion 152a of the fourth body ply 150 terminates at a first turn up end 154a. A second turn up portion 152b of the fourth body ply 150 extends upward, axially outside of the second annular bead 105b, axially inside the second turn up portion 122b of the first body ply 120, axially inside the second turn up portion 132b of the second body ply 130, and axially inside the second turn up portion 142b of the third body ply 140. The second turn up portion 152b of the fourth body ply 150 terminates at a second turn up end 154b. The first and second turn up ends 154a,b of the fourth body ply 150 have a fourth radial height 114 that is greater than the first radial height $H_1$, the second radial height 112, and the third radial height $H_3$.

In an alternative embodiment (not shown), the second height is greater than the third height, but still less than the first height and fourth height. In other alternative embodiments (not shown), having fewer than four body plies or greater than four body plies, the axially innermost turn up portion has the greatest height and the axially outermost turn up portion has the second greatest height. In such embodiments, the "sandwiched turn up portions" (i.e., any turn up portions located between the innermost turn up portion and outermost turn up portion) have heights that are less than those of the innermost turn up portion and outermost turn up portion. The sandwiched turn up portions may have progressively greater heights from the outermost turn up portion towards the innermost turn up portion. Alternatively, the sandwiched turn up portions may have progressively lesser heights from the outermost turn up portion towards the innermost turn up portion. In another alternative embodiment, the heights of the sandwiched turn up portions may vary in any manner.

One or more circumferential belts 160 are disposed radially above the body plies 120, 130, 140, 150. In the illustrated embodiment, a pair of belts are employed. In alternative embodiments, any number of belts may be employed.

The circumferential belt 160 extends axially across a portion of the body plies 120, 130, 140, 150. The tire may further include one or more cap plies 165 and an undertread (not shown).

A circumferential tread 170 is disposed radially above the circumferential belt 160 and the cap ply 165. The circumferential tread may include tread features (not shown), such as grooves, ribs, blocks, lugs, and sipes.

The tire 100 further includes a first sidewall 175a extending between the first annular bead 105a and the circumferential tread 170. A second sidewall 175b extends between the second annular bead 105b and the circumferential tread 170.

The tire 100 also has first and second stabilizer ply inserts 180a,b. The first stabilizer ply insert 180a has a first end that is axially inside a first end of the circumferential belt 160 and radially below the circumferential belt 160. The first stabilizer ply insert 180a has a second end that is axially outside of the first end of the circumferential belt 160 and radially lower than the first turn up end 124a of the first body ply 120 and radially lower than the first turn up end 154a of the fourth body ply 140. In an alternative embodiment (not shown), the second end of the first stabilizer ply insert is radially lower than the first turn up end of the fourth body ply, but radially higher than the first turn up end of the first body ply. In another alternative embodiment (not shown), the second end of the first stabilizer ply insert is radially lower than three or more of the turn up ends.

In the illustrated embodiment, the first stabilizer ply insert 180a contacts the first turn up portion 152a of the fourth body ply 150. In an alternative embodiment (not shown), the first stabilizer ply insert is spaced from the first turn up portion of the fourth body ply.

The second stabilizer ply insert 180b has a first end that is axially inside a second end of the circumferential belt 160 and radially below the circumferential belt 160. The second stabilizer ply insert 180b has a second end that is axially outside of the second end of the circumferential belt 160 and radially lower than the second turn up end 124b of the first body ply 120 and radially lower than the second turn up end 154b of the fourth body ply 140. In an alternative embodiment (not shown), the second end of the second stabilizer ply insert is radially lower than the second turn up end of the fourth body ply, but radially higher than the second turn up end of the first body ply. In another alternative embodiment (not shown), the second end of the second stabilizer ply insert is radially lower than three or more of the turn up ends.

In the illustrated embodiment, the second stabilizer ply insert 180b contacts the second turn up portion 152b of the fourth body ply 150. In an alternative embodiment (not shown), the second stabilizer ply insert is spaced from the second turn up portion of the fourth body ply.

In one embodiment, the first sidewall 175a and the second sidewall 175b are constructed of the same rubber compound as the first stabilizer ply insert 180a and the second stabilizer ply insert 180b. In an alternative embodiment, the first sidewall 175a and the second sidewall 175b are constructed of a different rubber compound than the first stabilizer ply insert 180a and the second stabilizer ply insert 180b.

To make a tire as shown in FIGS. 1 and 2, an operator provides a first body ply having a first width, a second body ply having a second width less than the first width, a third body ply having a third width less than the first width but greater than the second width, and a fourth body ply having a fourth width greater than the first, second, and third widths. The operator lays the second body ply above the first body ply, lays the third body ply above the second body ply, and lays the fourth body ply above the third body ply. The operator then lays a first bead at a first location above the fourth body ply and lays a second bead at a second location above the fourth body ply.

The operator also lays a first stabilizer ply insert at a third location above the fourth body ply, the third location being between the first location and the second location. The operator further lays a second stabilizer ply insert at a fourth location above the third body ply, the fourth location being between the third location and the second location. The operator then wraps the first body ply, second body ply, third body ply, and fourth body ply around the first bead, such that the first body ply has a first turn up portion with a first turn up height, the second body ply has a second turn up portion with a second turn up height less than the first turn up height, the third body ply has a third turn up portion with a third turn up height less than the first turn up height but greater than the second turn up height, and the fourth body ply has a fourth turn up portion with a fourth turn up height that is greater than the first, second, and third turn up heights.

The operator then wraps the first body ply, second body ply, third body ply, and fourth body ply around the second bead in a similar manner. When the wrapping is complete, the turn up portions of the fourth body ply contact the first stabilizer ply insert and the second stabilizer ply insert. It should be understood that the method may be performed with two or three body plies. It should be further understood that the method may be performed with five or more body plies.

The operator also lays a circumferential belt above the body plies, such that a first end of the circumferential belt contacts the first stabilizer ply insert and such that a second end of the circumferential belt contacts the second stabilizer ply insert. The operator further lays a circumferential tread above the circumferential belt. The operator also extends a first sidewall from a first bead region to the circumferential tread and extends a second sidewall from a second bead region to the circumferential tread.

Figure 3:
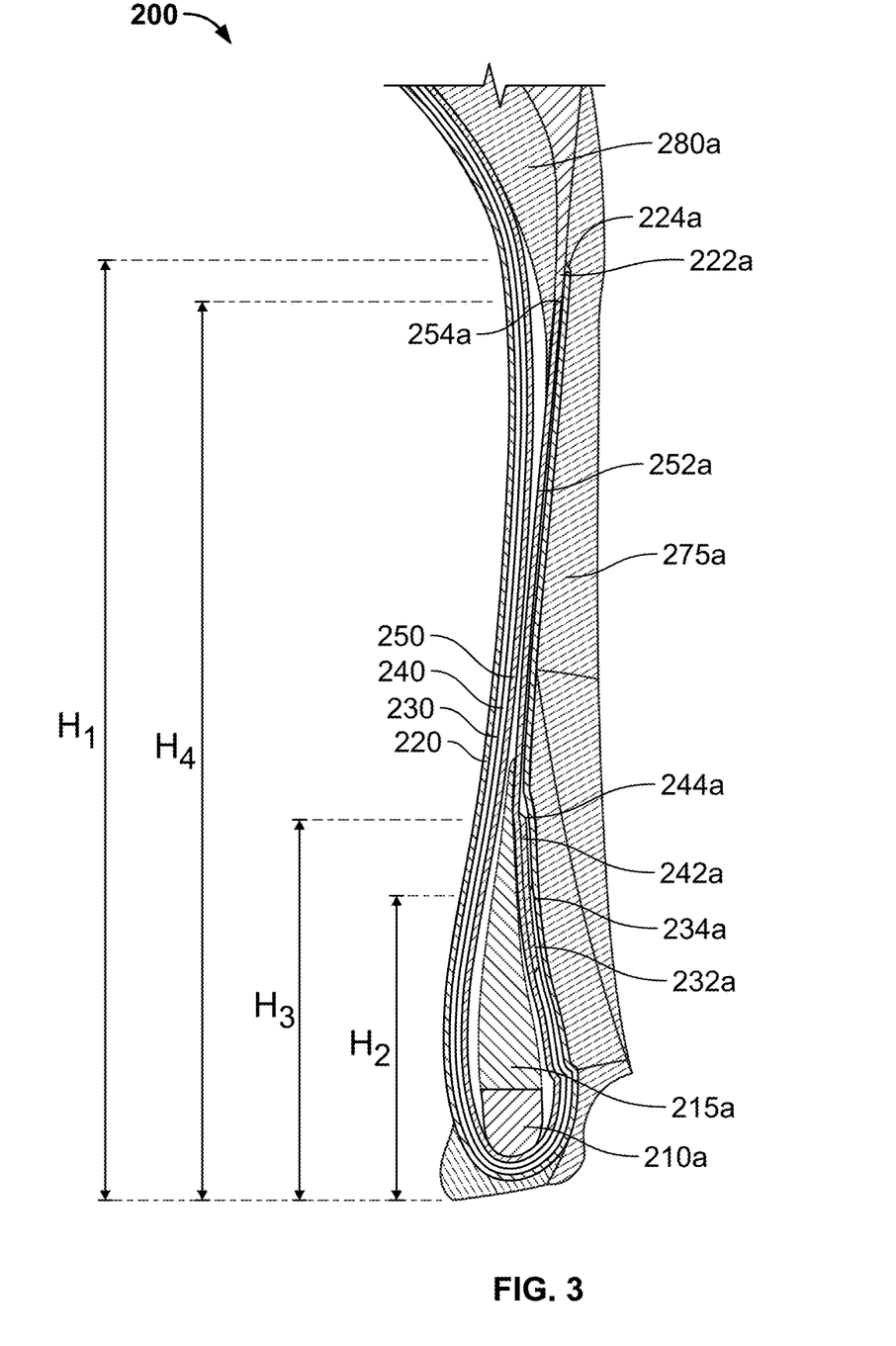
FIG. 3 is a detail view of a bead and sidewall portion of an alternative embodiment of a tire.

FIG. 3 is a detail view of a bead and sidewall portion of an alternative embodiment of a tire 200. The tire 200 is substantially the same as the tire 100 described above with respect to FIGS. 1 and 2, except for the differences discussed herein. The alternative embodiments described above with respect to tire 100 may also apply to tire 200.

In this embodiment, a first body ply 220 extends downward, axially inside of a first annular bead 205a and a second annular bead (not shown), and wraps around the first annular bead 205a and the second annular bead. A first turn up portion 222a of the first body ply 220 extends upward, axially outside of the first annular bead 205a and terminates at a first turn up end 224a. A second turn up portion (not shown) of the first body ply 220 extends upward, axially outside of the second annular bead (not shown) and terminates at a second turn up end (not shown). The first turn up end 224a and second turn up end of the first body ply 220 have a first radial height $H_1$.

A second body ply 230 extends downward, axially inside of the first annular bead 205a and the second annular bead (not shown) and axially outside of the first body ply 220, and wraps around the first annular bead 205a and the second annular bead. A first turn up portion 232a of the second body ply 230 extends upward, axially outside of the first annular bead 205a and axially inside the first turn up portion 222a of the first body ply 220, and terminates at a first turn up end 234a. A second turn up portion (not shown) of the second body ply 230 extends upward, axially outside of the second annular bead and axially inside the second turn up portion of the first body ply 220, and terminates at a second turn up end (not shown). The first turn up end 234a and the second turn up end of the second body ply 230 have a second radial height $H_2$ that is less than the first radial height $H_1$.

A third body ply 240 extends downward, axially inside of the first annular bead 205a and the second annular bead, and axially outside of the first body ply 220 and the second body ply 230. The third body ply 240 wraps around the first annular bead 205a and the second annular bead. A first turn up portion 242a of the third body ply 240 extends upward, axially outside of the first annular bead 205a, axially inside the first turn up portion 222a of the first body ply 220, and axially inside the first turn up portion 232a of the second body ply 230. The first turn up portion 242a of the third body ply 240 terminates at a first turn up end 244a. A second turn up portion (not shown) of the third body ply 240 extends upward, axially outside of the second annular bead, axially inside the second turn up portion (not shown) of the first body ply 220, and axially inside the second turn up portion (not shown) of the second body ply 230. The second turn up portion of the third body ply 240 terminates at a second turn up end (not shown). The first turn up end 244a and the second turn up end of the third body ply 240 have a third radial height $H_3$ that is less than the first radial height $H_1$, but greater than the second radial height $H_2$.

A fourth body ply 250 extends downward, axially inside of the first and second annular beads and axially outside of the first body ply 220, the second body ply 230, and the third body ply 240. The fourth body ply 250 wraps around the first and second annular beads. A first turn up portion 252a of the fourth body ply 250 extends upward, axially outside of the first annular bead 205a, axially inside the first turn up portion 222a of the first body ply 220, axially inside the first turn up portion 232a of the second body ply 230, and axially inside the first turn up portion 242a of the third body ply 240. The first turn up portion 252a of the fourth body ply 250 terminates at a first turn up end 254a. A second turn up portion (not shown) of the fourth body ply 250 extends upward, axially outside of the second annular bead, axially inside the second turn up portion (not shown) of the first body ply 220, axially inside the second turn up portion (not shown) of the second body ply 230, and axially inside the second turn up portion (not shown) of the third body ply 240. The second turn up portion of the fourth body ply 250 terminates at a second turn up end (not shown). The first turn up end 254a and the second turn up end (not shown) of the fourth body ply 250 have a fourth radial height $H_4$ that is greater than the second radial height $H_2$ and the third radial height $H_3$, but less than the first radial height $H_1$.

The tire 200 also has a first stabilizer ply insert 280a and a second stabilizer ply insert (not shown), similar to the stabilizer ply inserts 180a,b of tire 100. As can be seen in FIG. 3, the first stabilizer ply insert 180a has a lower end that is radially lower than the first turn up end 224a of the first body ply 220 and radially lower than the first turn up end 254a of the fourth body ply 240. In the illustrated embodiment, the first stabilizer ply insert 280a contacts and the first turn up portion 222a of the first body ply 220 the first turn up portion 252a of the fourth body ply 250.

Figure 4:
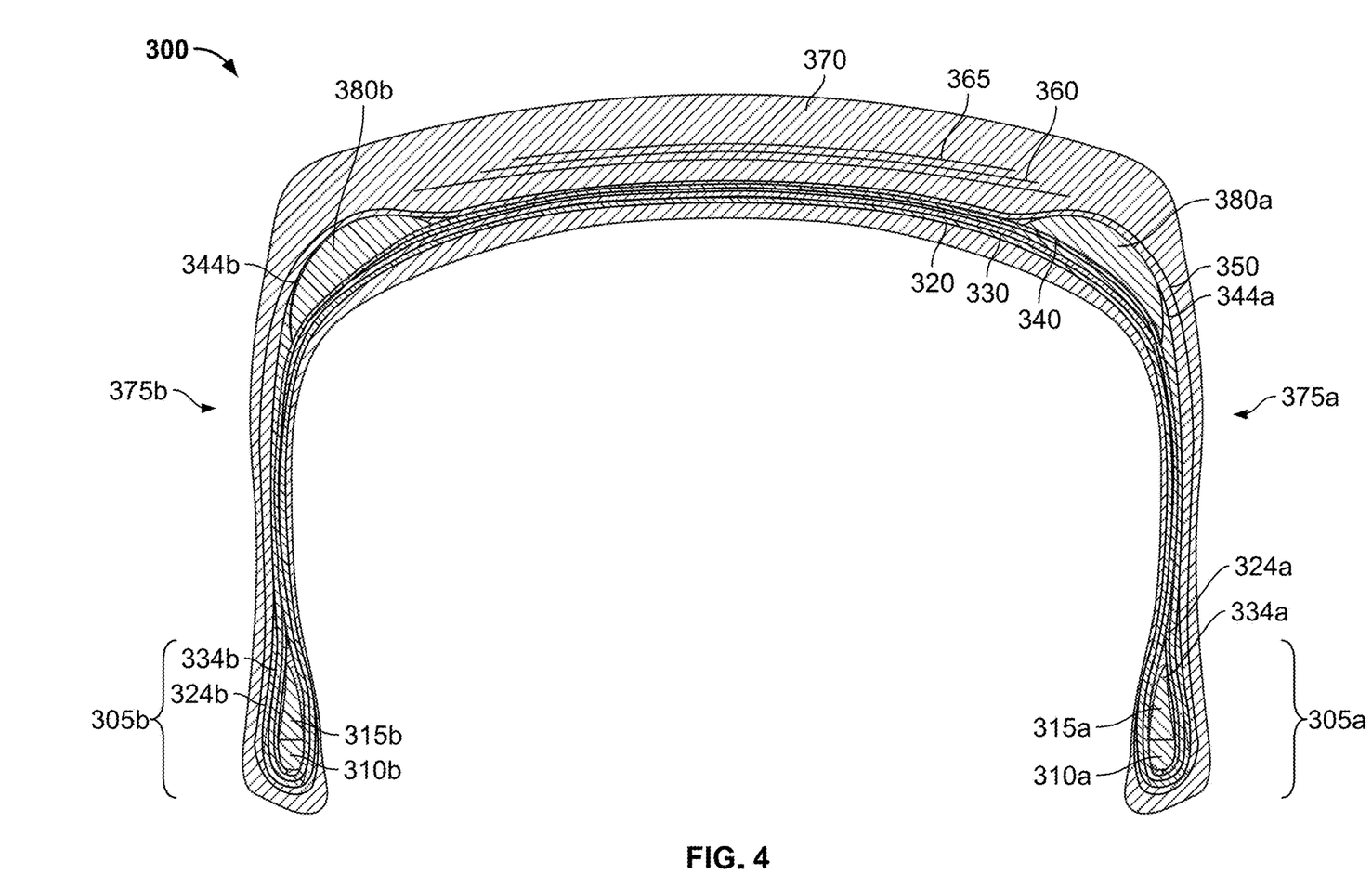
FIG. 4 is a partial cross-section of another alternative embodiment of a tire.

FIG. 4 is a partial cross-section of another alternative embodiment of a tire 300. The tire 300 is substantially the same as the tires 100, 200 described above with respect to FIGS. 1-3, except for the differences discussed herein. The alternative embodiments described above with respect to tires 100, 200 may also apply to tire 300.

The tire 300 includes a first annular bead portion 305a and a second annular bead portion 305b. The first annular bead portion 305a includes a first bead core 310a and a first bead filler 315a. A plurality of body plies extends between the first annular bead 305a and the second annular bead 305b. In the illustrated embodiment, the plurality of body plies includes a first body ply 320, a second body ply 330, a third body ply 340 and a turndown body ply 350.

The first body ply 320 extends downward, axially inside of the first and second annular beads 305a,b and wraps around the first and second annular beads 305a,b. A first turn up portion of the first body ply 320 extends upward, axially outside of the first annular bead 305a and terminates at a first turn up end 324a. A second turn up portion of the first body ply 320 extends upward, axially outside of the second annular bead 305b and terminates at a second turn up end 324b. The first and second turn up ends 324a,b of the first body ply 320 have a first radial height. In the illustrated embodiment, the first and second turn up ends 324a,b of the first body ply 320 are below the top of the first and second bead fillers 315a,b.

The second body ply 330 extends downward, axially inside of the first and second annular beads 305a,b and axially outside of the first body ply 320, and wraps around the first and second annular beads 305a,b. A first turn up portion of the second body ply 330 extends upward, axially outside of the first annular bead and axially inside the first turn up portion of the first body ply 320, and terminates at a first turn up end 334a. A second turn up portion of the second body ply 330 extends upward, axially outside of the second annular bead 305b and axially inside the second turn up portion of the first body ply 320, and terminates at a second turn up end 334b. The first and second turn up ends 334a,b of the second body ply 330 have a second radial height that is greater than the first radial height. In an alternative embodiment, the second radial height is less than the first radial height. In the illustrated embodiment, the first and second turn up ends 334a,b are below the top of the first and second bead fillers 315a,b.

The third body ply 340 extends downward, axially inside of the first and second annular beads 305a,b and axially outside of the first body ply 320 and the second body ply 330. The third body ply 340 wraps around the first and second annular beads 305a,b. A first turn up portion of the third body ply 340 extends upward, axially outside of the first annular bead, axially inside the first turn up portion of the first body ply 320, and axially inside the first turn up portion of the second body ply 330. The first turn up portion of the third body ply 340 terminates at a first turn up end 344a. A second turn up portion of the third body ply 340 extends upward, axially outside of the second annular bead 305b, axially inside the second turn up portion of the first body ply 320, and axially inside the second turn up portion of the second body ply 330. The second turn up portion of the third body ply 340 terminates at a second turn up end 344b. The first and second turn up ends 344a,b of the third body ply 340 have a third radial height that is greater than the first radial height and the second radial height.

The turndown body ply 350 extends downward in the sidewalls, axially outside of the first and second annular beads 305a,b and axially outside of the first body ply 320, the second body ply 330, and the third body ply 340. The turndown body ply 350 wraps around at least a portion of the first and second annular beads 305a,b. In the illustrated embodiment, the turndown body ply 350 terminates below the first and second annular beads 305a,b. In an alternative embodiment (not shown), the turndown body ply terminates axially inside the first and second annular beads. In another alternative embodiment (not shown), the turndown body ply wraps fully around the first and second annular beads and terminates radially above the first and second annular beads. In yet another alternative embodiment, the turndown body ply does not wrap around the first and second annular beads, and instead terminates axially outside the first and second annular beads.

One or more circumferential belts 360 are disposed radially above the body plies 320, 330, 340, and the turndown ply 350. In the illustrated embodiment, a pair of belts are employed. In alternative embodiments, any number of belts may be employed.

The circumferential belt 360 extends axially across a portion of the body plies 320, 330, 340, and the turndown ply 350. The tire 300 may further include one or more cap plies 365 and an undertread (not shown).

A circumferential tread 370 is disposed radially above the circumferential belt 360 and the cap ply 365. The circumferential tread may include tread features (not shown), such as grooves, ribs, blocks, lugs, and sipes.

The tire 300 further includes a first sidewall 375a extending between the first annular bead 305a and the circumferential tread 370. A second sidewall 375b extends between the second annular bead 305b and the circumferential tread 370. The tire 300 also has a first stabilizer ply insert 380a and a second stabilizer ply insert 380b, similar to the stabilizer ply inserts 180a,b of tire 100. As can be seen in FIG. 4, the first and second stabilizer ply inserts 180a,b have lower ends that are radially lower than the turn up ends 344a,b of the third body ply 340. In the illustrated embodiment, the first stabilizer ply insert 280a contacts and the turn up portions of the third body ply 340. In the illustrated embodiment, the turndown ply 350 extends above the first and second stabilizer ply inserts 380a,b. In an alternative embodiment (not shown), the turndown ply extends below the first and second stabilizer ply inserts. In another alternative embodiment (not shown), the stabilizer ply inserts may be omitted.

Figure 5:
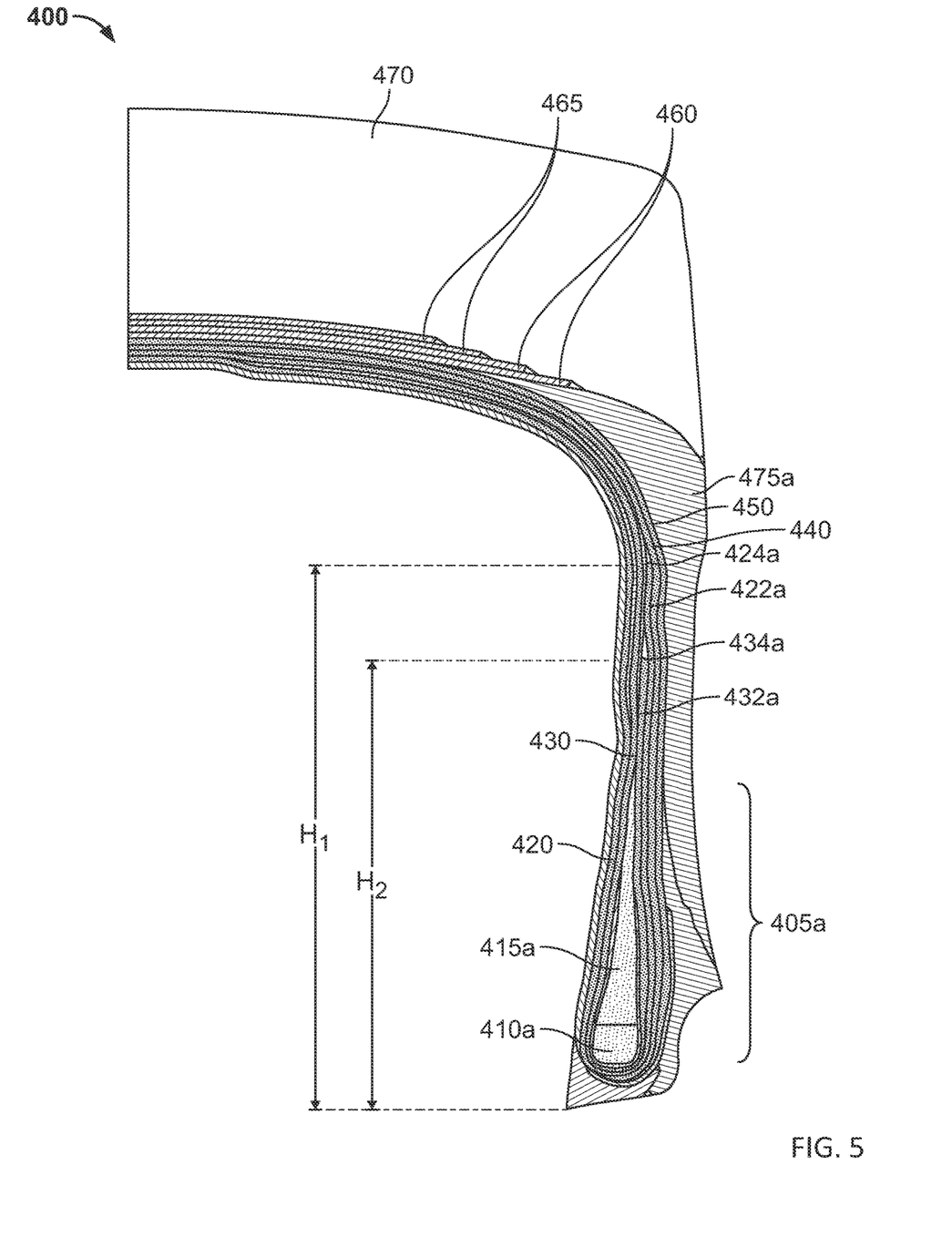
FIG. 5 is a detail view of a bead and sidewall portion of yet another alternative embodiment of a tire.

FIG. 5 is a detail view of a bead and sidewall portion of yet another alternative embodiment of a tire 400. The tire 400 is substantially the same as the tires 100, 200, 300 described above with respect to FIGS. 1-4, except for the differences discussed herein. The alternative embodiments described above with respect to tires 100, 200, 300 may also apply to tire 400.

In this embodiment, a first body ply 420 extends downward, axially inside of a first annular bead 405a and a second annular bead (not shown), and wraps around the first annular bead 405a and the second annular bead. A first turn up portion 422a of the first body ply 420 extends upward, axially outside of the first annular bead 405a and terminates at a first turn up end 424a. A second turn up portion (not shown) of the first body ply 420 extends upward, axially outside of the second annular bead (not shown) and terminates at a second turn up end (not shown). The first turn up end 424a and second turn up end of the first body ply 420 have a first radial height $H_1$.

A second body ply 430 extends downward, axially inside of the first annular bead 405a and the second annular bead (not shown) and axially outside of the first body ply 420, and wraps around the first annular bead 405a and the second annular bead. A first turn up portion 432a of the second body ply 430 extends upward, axially outside of the first annular bead 405a and axially inside the first turn up portion 422a of the first body ply 420, and terminates at a first turn up end 434a. A second turn up portion (not shown) of the second body ply 430 extends upward, axially outside of the second annular bead and axially inside the second turn up portion of the first body ply 420, and terminates at a second turn up end (not shown). The first turn up end 434a and the second turn up end of the second body ply 430 have a second radial height $H_2$ that is less than the first radial height $H_1$.

A pair of turndown body plies 440, 450 extend downward in the sidewalls 475a, axially outside of the first second annular 405a and the second annular bead (not shown) and axially outside of the first body ply 420 and the second body ply 430. The turndown body plies 440, 450 wrap around at least a portion of the first annular bead 405a and the second annular bead. In the illustrated embodiment, the turndown body plies 440, 450 terminate below the first and second annular beads. In an alternative embodiment (not shown), the turndown body plies terminate axially inside the first and second annular beads. In another alternative embodiment (not shown), the turndown body plies wrap fully around the first and second annular beads and terminate radially above the first and second annular beads. In yet another alternative embodiment, the turndown body plies do not wrap around the first and second annular beads, and instead terminate axially outside the first and second annular beads.

One or more circumferential belts 460 are disposed radially above the body plies 420, 430, and the turndown plies 440, 450. In the illustrated embodiment, a pair of belts are employed. In alternative embodiments, any number of belts may be employed.

The circumferential belt 460 extends axially across a portion of the body plies 420, 430, and the turndown plies 440, 450. The tire 400 may further include one or more cap plies 465 and an undertread (not shown).

A circumferential tread 470 is disposed radially above the circumferential belt 460 and the cap ply 465. The circumferential tread may include tread features (not shown), such as grooves, ribs, blocks, lugs, and sipes.

The tire 400 further includes a first sidewall 475a extending between the first annular bead 405a and the circumferential tread 470. A second sidewall (not shown) likewise extends between the second annular bead and the circumferential tread 470. Unlike the prior illustrated embodiments, the tire 400 does not include a stabilizer ply insert. Instead, as can be seen in FIG. 5, the first sidewall 475a has an upper end that extends radially inward, under the ends of the belts 460 and above the body plies 420, 430, and the turndown plies 440, 450. The second sidewall likewise has an upper end that extends radially inward, under the ends of the belts 460 and above the body plies 420, 430, and the turndown plies 440, 450.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A tire comprising:
   a first annular bead and a second annular bead;
   at least three body plies, including a first body ply, a second body ply, and a third body ply, extending between the first annular bead and the second annular bead,
      wherein the first body ply extends downward, axially inside of the first annular bead and wraps around the first annular bead,
         wherein the first body ply has a first turn up portion that extends upward, axially outside of the first annular bead, and
         wherein the first turn up portion terminates at a first turn up end,
      wherein the second body ply extends downward, axially inside of the first annular bead and axially outside of the first body ply and wraps around the first annular bead,
         wherein the second body ply has a second turn up portion that extends upward, axially outside of the first annular bead and axially inside the first turn up portion, and
         wherein the second turn up portion terminates at a second turn up end that is radially lower than the first turn up end, and
      wherein the third body ply extends downward, axially inside of the first annular bead and axially outside of the second body ply and wraps around the first annular bead,
         wherein the third body ply has a third turn up portion that extends upward, axially outside of the first annular bead and axially inside the second turn up portion, and
         wherein the third turn up portion terminates at a third turn up end that is radially higher than the first turn up end;
   a circumferential belt disposed radially above the at least three body plies and extending axially across a portion of the at least three body plies;
   a circumferential tread disposed radially above the circumferential belt;
   a first sidewall extending between the first annular bead and the circumferential tread;
   a second sidewall extending between the second annular bead and the circumferential tread;
   a first stabilizer ply insert,
      wherein the first stabilizer ply insert has a first end that is axially inside a first end of the circumferential belt and radially below the circumferential belt, and
      wherein the first stabilizer ply insert has a second end that is axially outside of the first end of the circumferential belt and radially lower than the first turn up end and the third turn up end; and
   a second stabilizer ply insert,
      wherein the second stabilizer ply insert has a first end that is axially inside a second end of the circumferential belt and radially below the circumferential belt, and
      wherein the second stabilizer ply insert has a second end that is axially outside of the second end of the circumferential belt.

2. The tire of claim 1, wherein the first sidewall and the second sidewall are constructed of a first rubber compound, and wherein the first stabilizer ply insert and the second stabilizer ply insert are constructed of a second rubber compound.

3. The tire of claim 2, wherein the first rubber compound is different from the second rubber compound.

4. The tire of claim 2, wherein the first rubber compound is the same as the second rubber compound.

5. The tire of claim 1, wherein the at least three body plies includes a fourth body ply extending between the first annular bead and the second annular bead.

6. The tire of claim 5, wherein the fourth body ply extends downward, axially inside of the first annular bead and axially outside of the first body ply and wraps around the first annular bead,
wherein the fourth body ply has a fourth turn up portion that extends upward, axially outside of the first annular bead and axially inside the first turn up portion, and
wherein the fourth turn up portion terminates at a fourth turn up end that is radially lower than the first turn up end.

7. The tire of claim 6, wherein the fourth body ply extends downward axially outside of the second body ply and wherein the fourth turn up portion extends upward, axially inside the second turn up portion.

8. The tire of claim 7, wherein the fourth turn up end is radially higher than the second turn up end.

9. The tire of claim 7, wherein the fourth turn up end is radially lower than the second turn up end.

10. A tire comprising:
a pair of beads;
a plurality of body plies extending between the pair of beads, including at least a first body ply, a second body ply, and a third body ply,
wherein the first body ply wraps around each of the pair of beads, and has a first pair of turn up portions having a first height,
wherein the second body ply wraps around each of the pair of beads, and has a second pair of turn up portions having a second height greater than the first height,
wherein the third body ply wraps around each of the pair of beads, and has a third pair of turn up portions having a third height less than the first height and less than the second height,
wherein each of the second pair of turn up portions is axially inside each of the first turn up portions, and
wherein each of the third pair of turn up portions is axially outside each of the second pair of turn up portions and axially inside each of the first turn up portions;
a circumferential belt disposed radially above the plurality of body plies;
a circumferential tread disposed radially above the circumferential belt;
a pair of sidewalls extending between the pair of beads and the circumferential tread; and
a pair of stabilizer ply inserts, including a first stabilizer ply insert and a second stabilizer ply insert,
wherein the first stabilizer ply insert has a first end that is radially below the circumferential belt, and a second end that is radially lower than an end of one of the first pair of turn up portions and radially lower than an end of one of the second pair of turn up portions, and
wherein the second stabilizer ply insert has a first end that is radially below the circumferential belt, and a second end that is radially lower than an end of one of the first pair of turn up portions and radially lower than an end of one of the second pair of turn up portions.

11. The tire of claim 10, wherein each of the pair of sidewalls are constructed of a first rubber compound, and wherein each of the stabilizer ply inserts are constructed of a second rubber compound.

12. The tire of claim 11, wherein the first rubber compound is the same as the second rubber compound.

13. The tire of claim 11, wherein the first rubber compound is different from the second rubber compound.

14. The tire of claim 10, wherein the second end of the first stabilizer ply insert is radially above a first end of the third body ply, and wherein the second end of the second stabilizer ply insert is radially above a second end of the third body ply.

15. The tire of claim 14, wherein the plurality of body plies includes a fourth body ply disposed between the first body ply and the second body ply.

16. The tire of claim 15, wherein the plurality of body plies includes a turndown ply.

17. The tire of claim 15, wherein the fourth body ply wraps around each of the pair of beads.

18. The tire of claim 17, wherein the fourth body ply has a pair of turn up portions having a fourth height less than the first height and less than the second height.

* * * * *